(12) United States Patent
Funderburk

(10) Patent No.: US 6,694,996 B2
(45) Date of Patent: Feb. 24, 2004

(54) SWING CHECK BACKFLOW PREVENTOR HAVING CHECK VALVE WITH LEVER ARM

(75) Inventor: Robert V. Funderburk, Salisbury, NC (US)

(73) Assignee: Conbraco Industries, Inc., Matthews, NC (US)

( * ) Notice: Subject to any disclaimer, the term of this patent is extended or adjusted under 35 U.S.C. 154(b) by 178 days.

(21) Appl. No.: 10/095,264

(22) Filed: Mar. 11, 2002

(65) Prior Publication Data

US 2003/0168105 A1 Sep. 11, 2003

(51) Int. Cl.⁷ ............................................... F16K 15/03
(52) U.S. Cl. .......................... 137/15.18; 137/315.33; 137/512; 137/527.2; 137/527.4
(58) Field of Search .................... 137/15.17, 15.18, 137/315.33, 512, 527, 527.2, 527.4; 251/337

(56) References Cited

U.S. PATENT DOCUMENTS

| | | | | |
|---|---|---|---|---|
| 2,647,534 A | * | 8/1953 | Freeman | 137/527.4 |
| 3,478,778 A | * | 11/1969 | Curtiss et al. | 137/527.4 |
| 3,789,874 A | * | 2/1974 | Hills | 137/527 |
| 3,996,962 A | * | 12/1976 | Sutherland | 137/527.4 |
| 4,552,174 A | * | 11/1985 | Carl et al. | 137/527.2 |
| 6,343,618 B1 | * | 2/2002 | Britt et al. | 137/527 |

* cited by examiner

*Primary Examiner*—John Rivell
(74) *Attorney, Agent, or Firm*—Adams Evans P.A.

(57) ABSTRACT

A swing check valve for controlling fluid flow, including a valve housing having a port for fluid flow therethrough. A valve assembly is disposed within the valve housing for controlling the fluid flow therethrough, and includes a valve seat communicating with the port. A clapper is pivotally mounted in the valve housing and moves between open and closed positions. A lever arm is pivotally mounted on the rocker arm for providing leverage against the rocker arm for positioning the clapper and rocker arm within the valve housing. A spring is captured in the valve housing, and normally urges the clapper into the closed position. A first pivot is carried by the spring for permitting unattached pivotal movement of the spring relative to the cover. A second pivot is carried by the spring for permitting the spring to pivot within the valve housing responsive to movement of the clapper.

29 Claims, 11 Drawing Sheets

SWING CHECK BACKFLOW PREVENTOR HAVING CHECK VALVE WITH LEVER ARM

TECHNICAL FIELD AND BACKGROUND OF THE INVENTION

This invention relates to a type of valve known as a "check-valve." Check valves are well known and are widely used to control backflow of fluids carrying undesirable contaminants into a fluid supply. These valves have evolved to become highly specialized in their function and operation, and are similar in that they all contain spring-loaded members that are biased toward the valve-closed position until fluid pressure acting on the checking members forces the valves open. Typically, a backflow preventer utilizes two check valves in a conventional serial combination for preventing the backflow of a fluid.

The pressure required to open a check valve is established by governmental regulation and provides a minimum degree of protection against reverse flow. Furthermore, regulations governing backflow preventers require that a check valve and associated parts must be removable for inspection and field service repair without having to remove the valve housing from the fluid conduit system to which it is attached.

In a conventional check valve design, the checking member is a poppet-type check in which the movement of the checking member is linear and remains in the fluid path. The energy required to open these check valves is provided by the fluid and is created at the source by, for example, a pump. The total energy of the fluid in motion is reduced by friction within the pipes and other obstacles in the fluid conduit system. Such obstacles include the checking members, which remain disposed directly in the fluid path once the check valves are open. This energy loss, also known as "headloss," should be as low as practicable in order to preserve fluid pressure.

Many designs have been proposed to reduce the headloss created by poppet check valves. One design uses a "swing check" type design in which the checking member, also called a clapper, rotates about a fixed hinge pin. The swing check valve is advantageous because it allows the checking member to move out of the path of fluid flow, thereby reducing the headloss associated with conventional poppet-check valves. Clapper and spring assemblies in these conventional swing check designs can be oriented so that as the clapper moves away from the valve-closed position, the torque produced by the spring force about the pivot axis of the clapper through the hinge pin is reduced, thereby further minimizing headloss.

Conventional swing check valves used in backflow preventers generally incorporate the same components. Typically, the clapper in such valves creates a fluid seal across a valve seat. The valve seat surrounds an opening through which fluid would otherwise flow. The valve seat is also usually positioned adjacent to a fluid inlet port in a valve housing of the fluid conduit system and is typically mounted by bolts to the valve housing. As the fluid flows through the port in the downstream direction, the clapper opens by rotating about a hinge pin that is positioned adjacent and parallel to the valve seat face. A helical compression spring is typically used to exert force onto the backside of the clapper. The quantity of water allowed to flow through the swing check valve directly depends on the opening angle of the clapper and the force of the compression spring on the clapper, which in turn acts to oppose the opening of the clapper. The force of the spring on the clapper is a function of the degree of compression between the clapper and some other rigid structure such as the valve housing—fluid pressure must exceed a predetermined magnitude to overcome the spring force on the clapper in order to open the valve.

A toggle-linkage swing check valve is disclosed in Ackroyd, U.S. Pat. No. 5,236,009 ("the '009 patent"). The swing check valve of the '009 patent includes a valve assembly having a clapper, spring, and valve seat connected together as a unit. The valve is pivotally mounted at opposite ends to the valve seat and clapper for reorientation of the spring force during movement of the clapper so that the resultant torque applied to the clapper decreases as the clapper moves away from the valve-closed position. A disadvantage to the swing check backflow preventer of the '009 patent is that when the valve requires maintenance, a cover of the valve housing must be removed and then retaining wires must be removed so that the valve assembly can be manually disengaged from the inlet and then withdrawn from the valve housing. Installation of the valve includes the reverse steps.

Another toggle-linkage swing check valve is disclosed in Dunmire, U.S. Pat. No. 4,989,635 ("the '635 patent"). The check valve of the '635 patent includes a valve assembly having a spring, clapper, and valve seat connected together as a unit. The spring is positioned between the clapper and a wall of the valve housing. The wall is preferably a recess defined in the cover of the valve housing. Moreover, the spring is positioned within the recess and pivotally mounted to the clapper for urging the clapper into the valve-closed position so that the torque produced by the spring on the clapper decreases as the clapper pivots away from the valve-closed position. The clapper is attached to the valve seat, which is in turn mounted by bolts to the valve housing. A disadvantage to the swing check valve of the '635 patent is that replacing the valve assembly requires that the housing cover first be removed. The bolts that attach the valve assembly to the valve housing must then be removed. Only then may the valve assembly be withdrawn from the valve housing, provided that careful control of the spring is maintained. Without such control, the spring becomes free to pivot about its attachment to the clapper once the cover is removed. The valve assembly of the '635 patent thus presents an awkward handling situation whenever the valve assembly requires assembly, replacement, or maintenance.

Yet another design for swing check valves is the "Regev" valve manufactured by A. R. I. Kfar Charuv of Ramot Hagolan, Israel. The valve includes a valve housing having a spring and a clapper that are positioned adjacent an inlet port of a valve housing. The spring includes a spring base, and the clapper has a cam member that remains in continuous engagement with the spring base. The clapper is mounted to the valve housing by a hinge pin. The spring is positioned in a valve housing recess above the clapper and is axially compressible in a direction perpendicular to fluid flow through the valve housing. This forces engagement of the spring base with the cam member to force the clapper toward the valve-closed position. The spring does not vary in its orientation during movement of the clapper as in the toggle-linkage designs discussed above, i.e., the spring is not pivotally mounted at its ends. The torque produced by the spring force on the clapper about the hinge pin is reduced as the clapper moves away from the valve-closed position, thereby minimizing headloss. A disadvantage to the Regev valve is that, in order to replace any component of the valve assembly or replace the entire valve assembly itself, the entire valve housing must be removed from the fluid conduit system and replaced. Furthermore, unlike the valves of the '009 and '635 patents, there is no valve assembly disposable within a valve housing in the Regev valve which can be removed from a fluid conduit system without removing the valve housing as required by backflow preventer regulation.

More recent designs for swing-type backflow preventer valves are disclosed in applicant's U.S. Pat. Nos. 5,711,341 and 5,794,655. Both of these patents disclose a valve housing having a spring and a clapper that are positioned adjacent an inlet port. The spring includes a base, with the rocker arm of the clapper having a roller which remains in continuous engagement with the spring base. The top end of the spring is attached to the interior surface of a hydraulic tap threaded into the valve housing. The clapper is mounted to the valve housing by a hinge pin. The spring is positioned in a valve housing recess above the clapper, and is axially compressible in a direction perpendicular to fluid flow through the valve housing. This forces engagement of the spring base with the cam member to force the clapper toward the valve-closed position. The spring remains in a position perpendicular to the direction of fluid flow at all times.

SUMMARY OF THE INVENTION

Therefore, it is an object of the invention to provide a swing check valve which can be easily and readily removed from and inserted into a valve housing of a fluid conduit system by simply removing and installing, respectively, a cover of the valve housing.

It is another object of the invention to provide a swing check valve which has a simple, low maintenance, low friction clapper mechanism that creates low headloss.

It is another object of the invention to provide a swing check valve that has a lever arm attached to the clapper mechanism for generating increased leverage against the clapper mechanism to ease installation of the check valve within the interior of the valve housing.

It is another object of the invention to provide a swing check valve which has a narrow profile, thereby reducing valve height.

It is another object of the invention to provide a swing check valve which has a compression spring which is self-contained and requires no interior attachment.

It is another object of the invention to provide a swing check valve which is energized during final assembly.

It is another object of the present invention to provide a swing check valve which includes a spring that is removably positioned against the valve housing cover and that is oriented for axial compression and expansion of the spring at varying angles within a range of angles, all of which are oblique to the direction of fluid flow through the valve housing.

It is another objective of the present invention to provide a swing check backflow preventer which utilizes two swing-check valves of the present invention in serial combination with one another.

These and other objects of the present invention are achieved in the preferred embodiments disclosed below by providing a swing check valve for controlling fluid flow and including a valve housing having a port for fluid flow therethrough. The valve housing includes a removable cover for accessing an interior of the valve housing. A valve assembly is disposed within the interior of the valve housing for controlling the fluid flow through the valve housing. The valve assembly includes a valve seat in fluid communication with the port. A clapper is mounted in the valve housing on a pivotally-mounted rocker arm and is moveable between an open position responsive to fluid flow in a flow direction and a sealed position against the valve seat responsive to fluid flow in an opposite, backflow direction. A spring is captured in the valve housing by the removable cover without attachment to either the cover or valve housing, and normally urges the clapper into the sealed position against the valve seat. A lever arm is pivotally mounted on the rocker arm. The lever arm is moveable between an extended position for providing enhanced leverage against the rocker arm for positioning the clapper and rocker arm within the valve housing, and a closed position for cooperating with the spring for urging the clapper into the sealed position. A first pivot is carried by the spring and cooperates with a mating interior surface of the cover for permitting unattached pivotal movement of the spring relative to the cover. A second pivot is carried by the spring and cooperates with a first mating pivot surface carried on the lever arm for permitting unattached pivotal movement of the spring relative to the lever arm whereby the spring is allowed to pivot within the valve housing responsive to movement of the clapper.

According to one preferred embodiment of the invention, the lever arm is a pair of spaced-apart, opposing planar members defining a void therebetween for receiving the spring.

According to another embodiment of the invention, a spacer interconnects the planar members for maintaining the void therebetween.

According to yet another embodiment of the invention, a third pivot is carried by the rocker arm and cooperates with a second mating pivot surface carried on the lever arm for pivotally mounting the lever arm on the rocker arm.

According to yet another embodiment of the invention, a fourth pivot is carried by the lever arm and cooperates with a third mating pivot surface carried on the rocker arm for permitting pivotal movement of the lever arm relative to the spring and the rocker arm.

According to yet another embodiment of the invention, the first pivot carried by the spring is a ball and the mating interior surface of the cover is a concave surface against which the ball pivots.

According to yet another embodiment of the invention, the second pivot is a convex bearing surface carried by the spring and the first mating pivot surface carried on the lever arm includes at least one roller.

According to yet another embodiment of the invention, the at least one roller moves in an arc along the convex bearing surface as the clapper pivots.

According to yet another embodiment of the invention, the at least one roller is mounted and extends between the opposing planar members.

According to yet another embodiment of the invention, the third pivot is a hinge pin and the second mating pivot surface carried on the lever arm is a complementary opening defined by the lever arm and adapted for receiving the hinge pin therethrough.

According to yet another embodiment of the invention, the third mating pivot surface carried on the rocker arm is a hinge pin and the fourth pivot carried by the lever arm is a pair of concave surfaces against which the hinge pin pivots.

According to yet another embodiment of the invention, each of the concave surfaces is a notch defined by a side edge of a respective one of the planar members.

According to yet another embodiment of the invention, the spring is removably positioned within the valve housing for being axially compressed and expanded between two angles responsive to movement of the clapper, both of which angles are oblique to the direction of flow of fluid through the valve housing.

According to yet another embodiment of the invention, the force of said spring acting on the clapper when the clapper is in the closed position produces a torque that is greater than the torque produced by the spring acting on the clapper when the clapper is in the open position.

According to yet another embodiment of the invention, an alignment compensator is included for preventing out-of-alignment movement of the clapper relative to the valve seat. The alignment compensator includes an alignment spring mounted on the rocker arm and engaging the clapper at a point wherein the point of attachment of the rocker arm to the clapper is between the alignment spring and the pivot point of the rocker arm.

According to yet another embodiment of the invention, the alignment spring is a coil spring.

According to yet another embodiment of the invention, alignment spring is a flat spring.

According to yet another embodiment of the invention, a swing check backflow preventer valve is provided which includes a valve housing having a port for fluid flow therethrough. The valve housing has a pair of spaced-apart removable covers for accessing an interior of the valve housing. A pair of valve assemblies are disposed within the interior of the valve housing for controlling the fluid flow through the valve housing. One of the valve assemblies includes a valve seat in fluid communication with the port. A clapper is pivotally mounted in the valve housing on a rocker arm and is moveable between an open position responsive to fluid flow in a downstream direction and a closed position sealed against the valve seat responsive to fluid flow in an opposite, backflow direction. A spring is captured in the valve housing by one of the removable covers without attachment to either the cover or valve housing. The spring normally urges the clapper into the sealed position against the valve seat. A lever arm is pivotally mounted on the rocker arm and is moveable between an extended position for providing enhanced leverage against the rocker arm for positioning the clapper and rocker arm within the valve housing and a closed position for cooperating with the spring for urging the clapper into the sealed position. A first pivot is carried by the spring and cooperates with a mating interior surface of the cover for permitting pivotal movement of the spring relative to the cover. A second pivot is carried by the spring and cooperates with a mating pivot surface carried on the lever arm for permitting pivotal movement of the spring relative to the lever arm whereby the spring is allowed to pivot within the valve housing responsive to movement of the clapper.

According to yet another embodiment of the invention, the lever arm included in the swing check backflow preventer valve includes a pair of spaced-apart, opposing planar members defining a void therebetween for receiving the spring.

According to yet another embodiment of the invention, the swing check backflow preventer valve includes a spacer interconnecting the planar members for maintaining the void therebetween.

According to yet another embodiment of the invention, the swing check backflow preventer valve includes a third pivot carried by the rocker arm and cooperating with a second mating pivot surface carried on the lever arm for pivotally mounting the lever arm on the rocker arm.

According to yet another embodiment of the invention, the swing check backflow preventer valve includes a fourth pivot carried by the lever arm and cooperating with a third mating pivot surface carried on the rocker arm for permitting pivotal movement of the lever arm relative to the spring and the rocker arm.

According to yet another embodiment of the invention, the second pivot included in the swing check backflow preventer is a convex bearing surface carried by the spring, and the first mating pivot surface carried on the lever arm is at least one roller.

According to yet another embodiment of the invention, the at least one roller included in the swing check backflow preventer valve is mounted and extends between the opposing planar members.

According to yet another embodiment of the invention, the third mating pivot surface carried on the rocker arm and included in the swing check backflow preventer valve is a hinge pin, and the fourth pivot carried by the lever arm is a pair of concave surfaces against which the hinge pin pivots.

According to yet another embodiment of the invention, each of the concave surfaces included in the swing check backflow preventer valve is a notch defined by a side edge of a respective one of the planar members.

According to yet another embodiment of the invention, a swing check valve for controlling fluid flow is provided that includes a valve housing having a port for fluid flow therethrough. The valve housing includes a removable cover for accessing an interior of the valve housing. A valve assembly is disposed within the interior of the valve housing for controlling the fluid flow through the valve housing. The valve assembly includes a valve seat in fluid communication with the port, and a rocker arm having proximal and distal ends. The proximal end is pivotally mounted to the valve seat for being positioned adjacent the port. A clapper is mounted on the distal end of the rocker arm and cooperates with the rocker arm for movement between an open position responsive to fluid flow in a flow direction and a sealed position against the valve seat responsive to fluid flow in an opposite, backflow direction. A spring is captured in the valve housing by the removable cover without attachment to either the cover or valve housing, and normally urges the clapper into the sealed position against the valve seat. A pair of spaced-apart, opposing planar members having a void defined therebetween are mounted on the rocker arm by a hinge pin received within a complementary bore defined by the rocker arm. This permits coupled movement of the planar members between an extended position for providing enhanced leverage against the rocker arm for positioning the clapper and rocker arm within the valve housing and a closed position for cooperating with the spring for urging the clapper into the sealed position. A first pivot is carried by the spring and cooperates with a mating interior surface of the cover for permitting unattached pivotal movement of the spring relative to the cover. A second pivot is also carried by the spring and cooperates with a first mating pivot surface carried on the lever arm for permitting unattached pivotal movement of the spring relative to the lever arm, whereby the spring is allowed to pivot within the valve housing responsive to movement of the clapper.

According to yet another preferred embodiment of the invention, another swing check valve is provided for controlling fluid flow. The swing check valve includes a valve housing having a port for fluid flow therethrough, and a removable cover for accessing an interior of the valve housing. A valve assembly is disposed within the interior of the valve housing for controlling the fluid flow through the valve housing. The valve assembly includes a valve seat in fluid communication with the port, and a rocker arm having proximal and distal ends. The proximal end is pivotally mounted to the valve seat for being positioned adjacent the port. A clapper is mounted on the distal end of the rocker arm and cooperates with the rocker arm for movement between an open position responsive to fluid flow in a flow direction and a sealed position against the valve seat responsive to fluid flow in an opposite, backflow direction. A spring is captured in the valve housing by the removable cover without attachment to either the cover or valve housing and normally urgings the clapper into the sealed position against the valve seat. A void is defined between a pair of spaced-apart, opposing planar members. The planar members are mounted on the rocker arm by a hinge pin received within a complementary bore defined by the rocker arm, for permitting coupled movement of the planar members between an extended position for providing enhanced leverage against the rocker arm for positioning the clapper and rocker arm within the valve housing, and a closed position for cooperating with said spring for urging the clapper into the sealed position. A convex pivot surface is carried by the spring and cooperates with a mating concave interior surface defined by the cover for permitting pivotal movement of the spring relative to the cover. A convex bearing surface is also carried by the spring and cooperates with at least one roller interconnecting the planar members for permitting unattached pivotal movement of the spring relative to the lever arm whereby the spring is allowed to pivot within the valve housing responsive to movement of the clapper.

An embodiment of a method according to the present invention is provided for installing a valve assembly in a valve housing. The method includes the step of providing a valve housing having a port for fluid flow therethrough. The valve housing includes a removable cover for accessing an interior of the valve housing. The method also includes the step of providing a valve assembly adapted for disposal within the interior of the valve housing for controlling the fluid flow through the valve housing. The valve assembly includes a valve seat in fluid communication with the port, and a clapper adapted for being mounted in the valve housing. The clapper is pivotally mounted on a rocker arm and is moveable between an open position responsive to fluid flow in a flow direction and a sealed position against the valve seat responsive to fluid flow in an opposite, backflow direction. The valve assembly also includes a spring adapted for being captured in the valve housing by the removable cover without attachment to either the cover or valve housing for normally urging the clapper into the sealed position against the valve seat, and a lever arm pivotally mounted on the rocker arm. The lever arm is moveable between an extended position for providing enhanced leverage against the rocker arm for positioning the clapper and rocker arm within the valve housing, and a closed position for cooperating with the spring for urging the clapper into the sealed position. The valve assembly also includes a first pivot carried by the spring and adapted for cooperating with a mating interior surface of the cover for permitting unattached pivotal movement of the spring relative to the cover, and a second pivot carried by the spring for cooperating with a first mating pivot surface carried on the lever arm. Mounting the second pivot in this manner permits unattached pivotal movement of the spring relative to the lever arm whereby the spring is allowed to pivot within the valve housing responsive to movement of the clapper. The method further includes the steps of removing the cover from the valve housing, thereby permitting access to the interior of the valve housing, and disposing the valve assembly in the valve housing. The valve assembly is disposed in the valve housing by moving the lever arm to the extended position, positioning the clapper and rocker arm within the valve housing by using the extended lever arm to provide enhanced leverage against the rocker arm, moving the lever arm to said closed position, positioning the spring within the valve housing, and replacing the cover on the valve housing. This captures the spring in the valve housing and permits the spring to cooperate with the closed lever arm for urging the clapper into the sealed position.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED
EMBODIMENT AND BEST MODE

Figure 1:
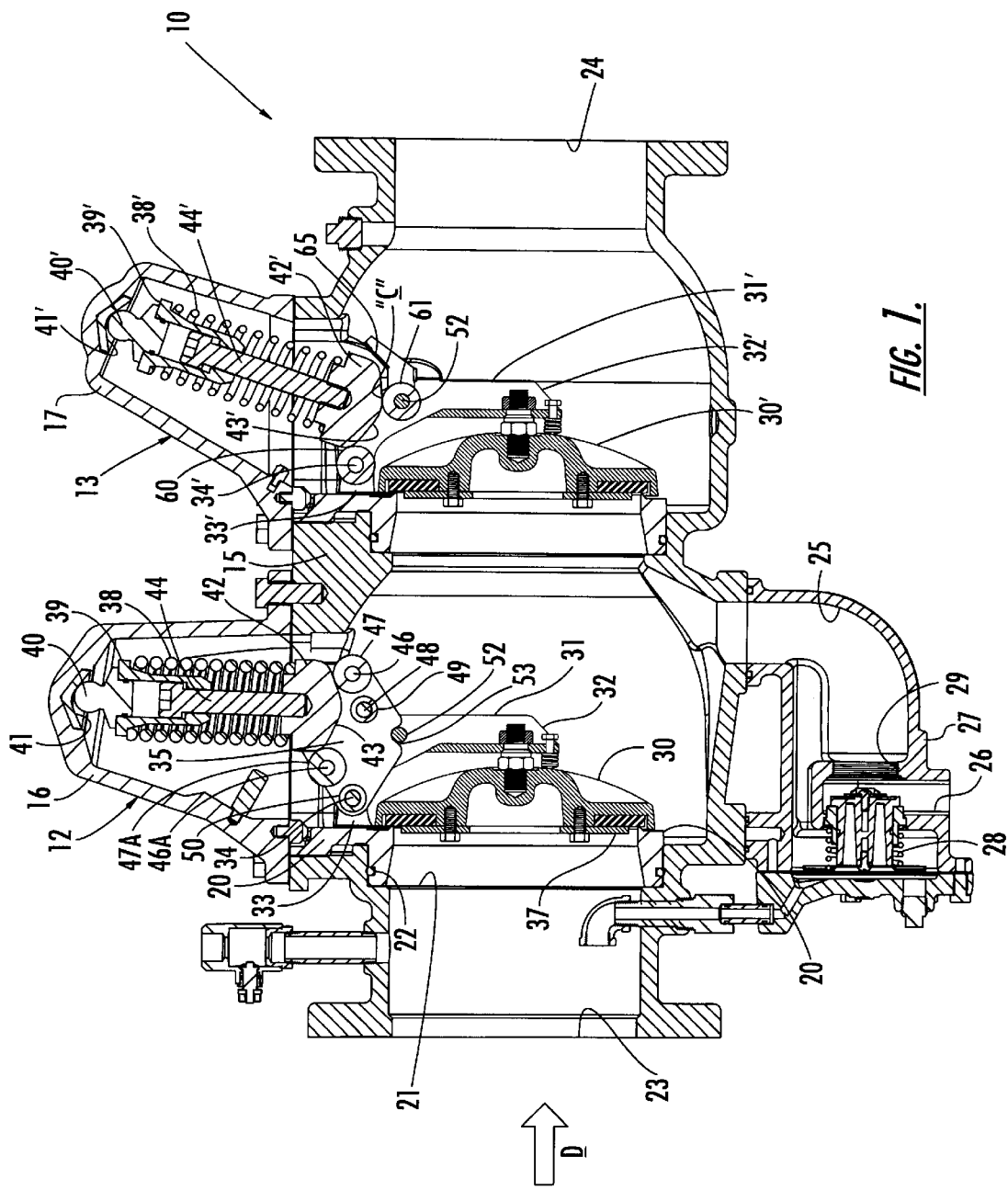
FIG. 1 is a cross-sectional view of a backflow preventer including a valve housing having two swing check valves of the present invention in the valve-closed position.

Referring now specifically to the drawings, a backflow preventer according to the present invention is illustrated in FIG. 1 and shown generally at reference numeral 10. The backflow preventer 10 includes two check valves 12 and 13 positioned in series within the same valve housing 15. Serial combination of two swing check valves in a valve housing to form a backflow preventer is well known in the art and will not be described in detail.

Regulations governing the design, manufacture, installation and maintenance of backflow preventers require that check valves and associated parts be removable for inspection and repair in the field without removing the valve housing from the waterline. The valve housing 15 thus includes two housing covers 16 and 17 removably attached by bolts 19 to the valve housing 15. Attaching the housing covers 16 and 17 in this manner permits access to the interior of the valve housing 15.

As is shown in FIG. 1, swing check valve 12 includes a valve seat 20 frictionally positioned within a port 21 of the valve housing 15. An o-ring 22 is captured in an annular o-ring groove and forms a fluid seal between the valve seat 20 and the valve housing 15. Fluid which is to be controlled by the swing check valves 12 and 13 normally flows through the valve seat 20 from an inlet conduit 23 and to an outlet conduit 24 upstream to downstream in the direction "D" shown. However, in the event of back pressure downstream from valve 13 that may cause fluid to seep past valve 13 and move upstream toward valve 12, the fluid will flow through an intermediate conduit 25 through a discharge conduit 26 of an intermediate valve housing 27. Fluid flow through the discharge conduit 26 is controlled by a relief valve assembly 28. The relief valve assembly 28 is removably positioned within a port 29, and is designed to open when the static pressure between the valves 12 and 13 increases to within 2–3 psi of the pressure of fluid located immediately upstream from valve 12.

When in the closed position, valve 12 maintains a static fluid pressure in the housing between the valves 12 and 13 that is approximately 7 pounds per square inch ("psi") less than the pressure of fluid located upstream from the valve 12. When in the closed position, the valve 13 similarly maintains a static pressure level downstream from the valve 13 that is approximately 1.5 psi less than that pressure level maintained between valves 12 and 13.

As is shown in FIG. 1, the valve 12 also includes a clapper 30 which is pivotally mounted by means of a rocker arm 31 to the valve seat 20. The rocker arm 31 includes a distal end 32 to which the clapper 30 is mounted and a proximal end 33 that is pivotally mounted on the valve seat 20 by a hinge pin 34. A lever arm 35 is pivotally mounted on the proximal end 33 by the hinge pin 34. As described below with reference to FIGS. 7, 8 and 9, the lever arm 35 moves between open and closed positions, which enables the valve 12 to be easily positioned within and removed from the housing 15.

Figure 2:
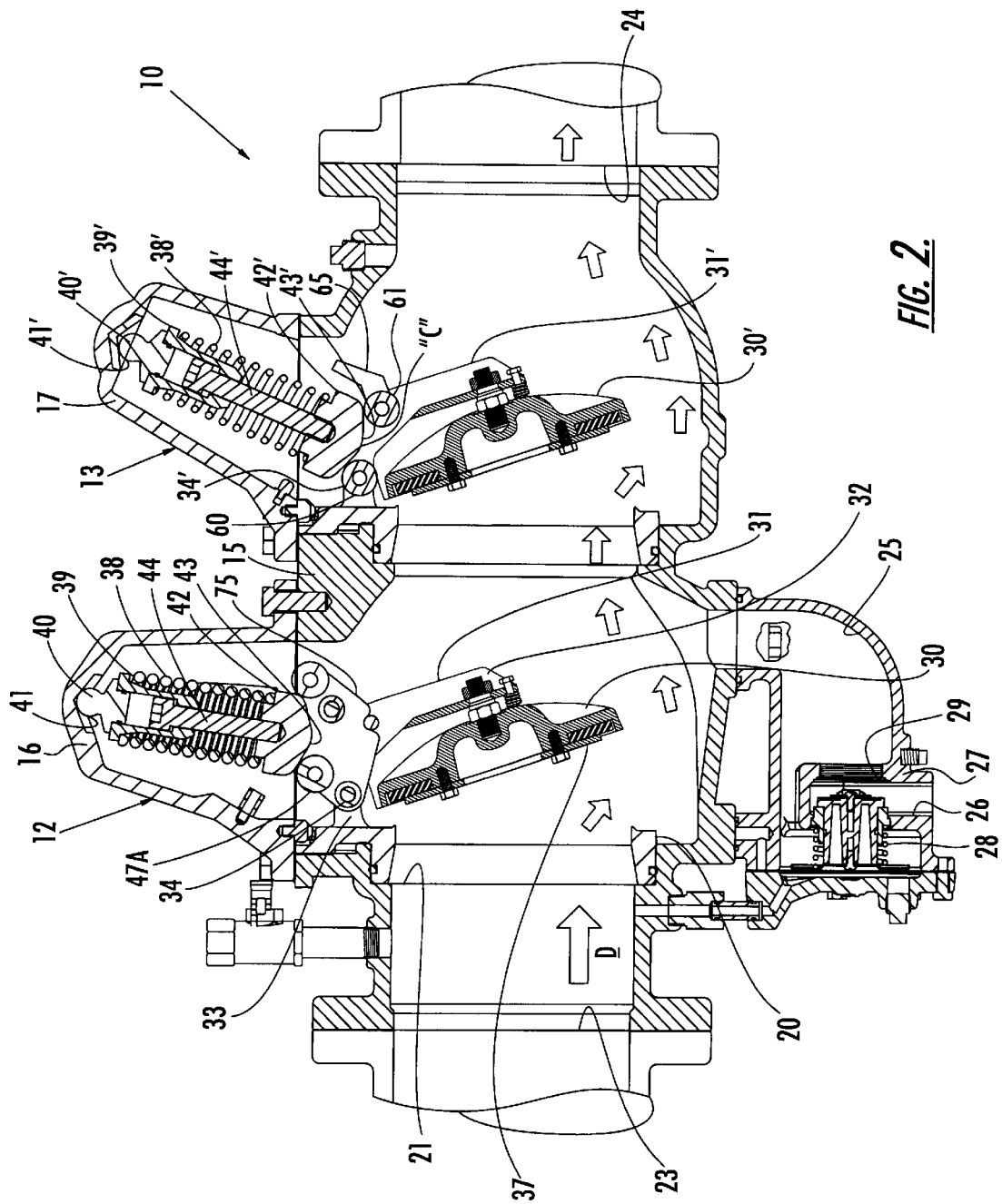
FIG. 2 is a cross-sectional view of the backflow preventer of FIG. 1 showing the swing check valves in the valve-open position.

The clapper 30 pivots between a first position shown in FIG. 1 in which the clapper 30 engages the valve seat 20 and a second position shown in FIG. 2 in which the clapper 30 is pivoted out of engagement with the valve seat 20. When in abutting engagement with the valve seat 20, the clapper 30 forms a fluid-tight seal thereby blocking fluid backflow. The clapper 30 preferably includes a rubber face 37 which provides a sealing face with the valve seat 20.

Figure 3:
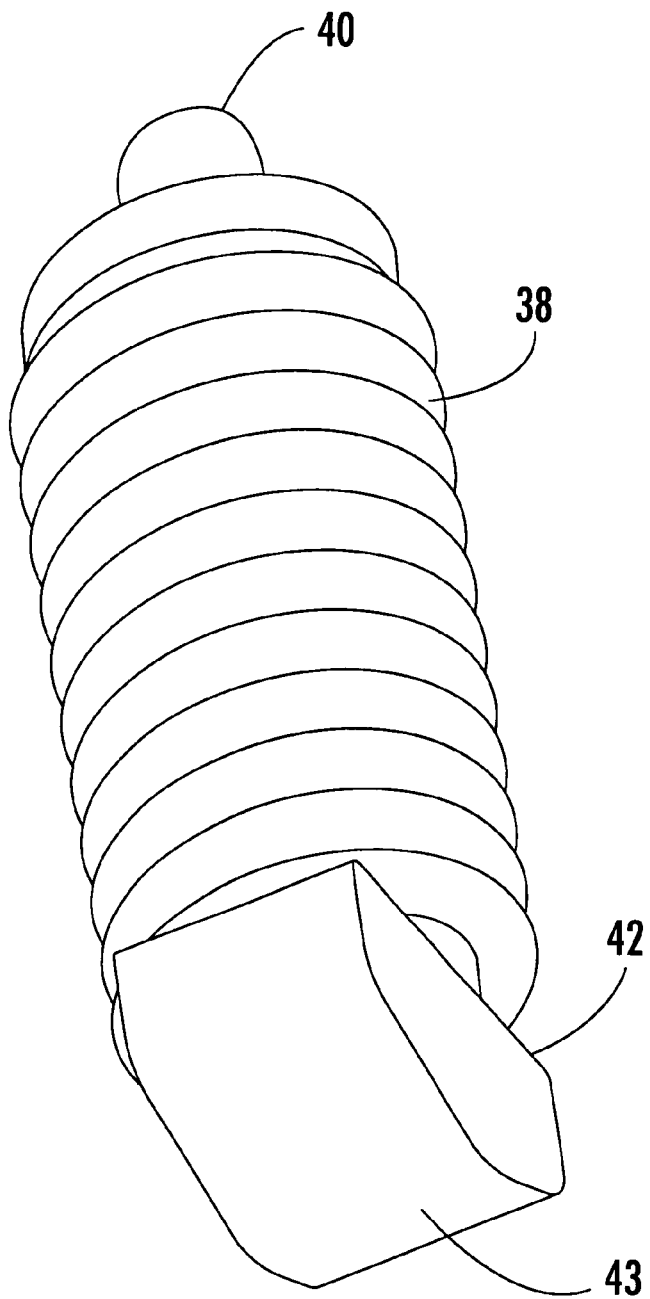
FIG. 3 is a perspective view of a spring assembly of the swing check valve of the present invention.

A compression spring 38 is mounted for pivotal movement within the housing cover 16 and housing 15. The spring 38 is captured within the valve housing 15 and cover 16 without any attachment to any other part of the valve 12. As is shown in FIG. 1, the top end of the spring 38 includes an annular cap 39 that carries a pivot in the form of a ball 40. Although the ball 40 may be formed from any suitable substance, the ball 40 is preferably formed from brass. The ball 40 engages a concave surface 41 on the inside surface of the cover 16 and is therefore permitted to pivot in any direction. As is shown in FIG. 3, the bottom end of the spring 38 includes a rocker shoe 42 which has a convex cam surface 43.

Referring again to FIGS. 1 and 2, a preload screw 44 is adjustably threaded into the rocker shoe 42 and permits initial adjustment of the tension of the spring 38.

Figure 4:
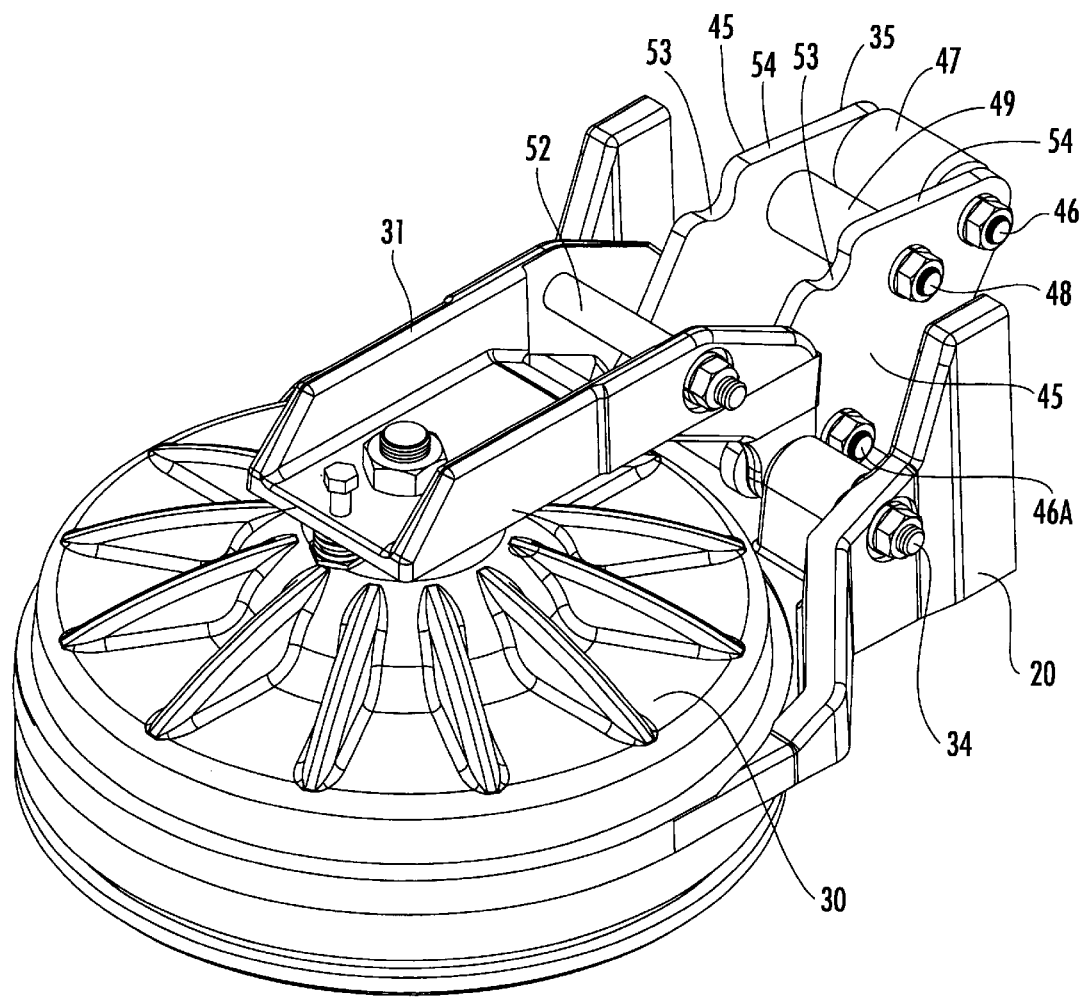
FIG. 4 is a perspective view of the valve assembly of the present invention removed from the valve housing and with the lever arm in an open position.
Figure 5:
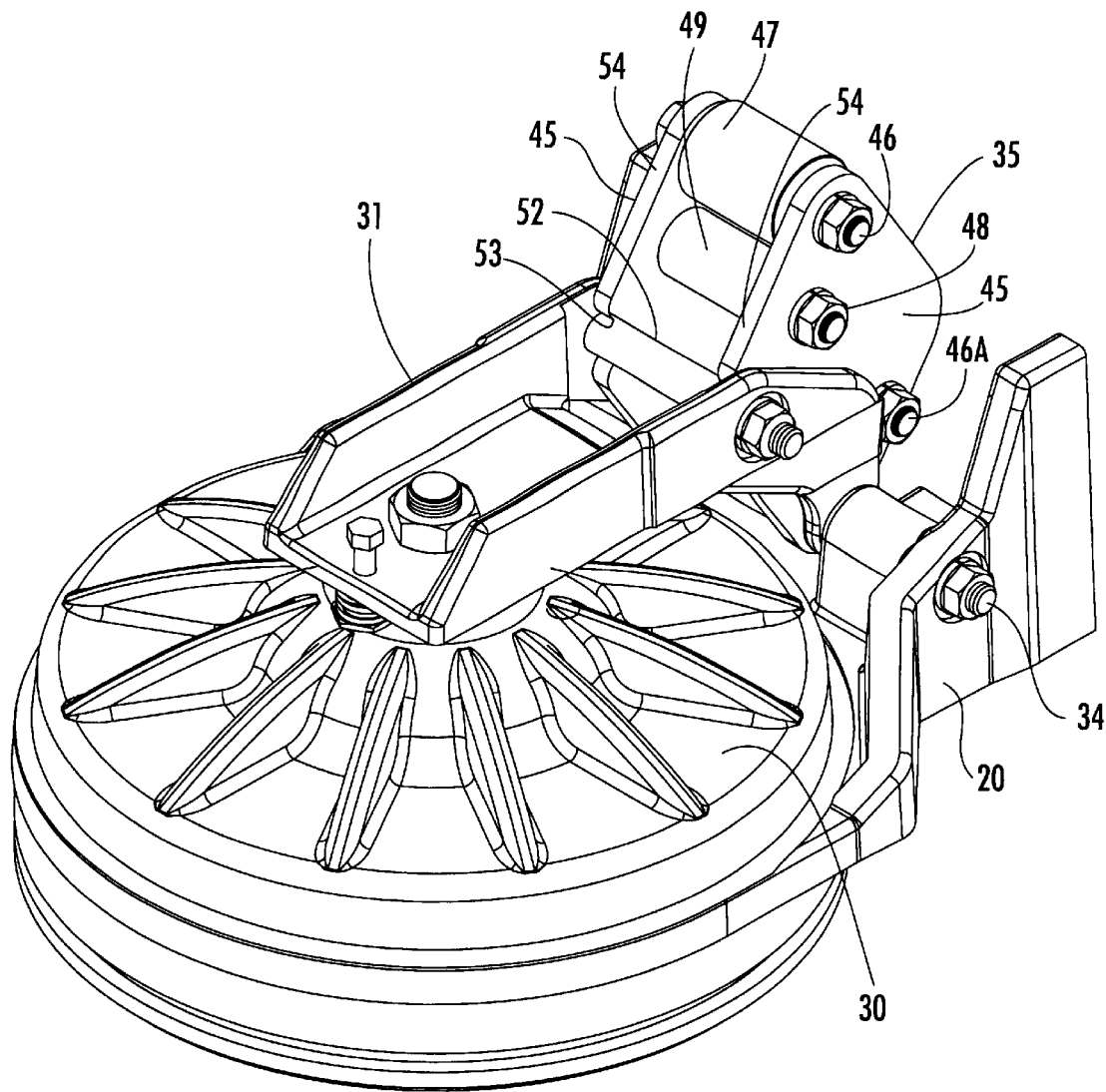
FIG. 5 is a perspective view of the valve assembly according to FIG. 4 with the lever arm in a closed position.

Referring now to FIG. 4, the clapper 30 and rocker arm 31 are shown removed from the backflow preventer 10, with the lever arm 35 in an open position and ready for being placed within the valve housing 15. The lever arm 35 includes two identically shaped, spaced-apart plates 45 between which two hinge pins 46 and 46A extend (see FIG. 1). Dynamic rollers 47 and 47A are mounted on hinge pins 46 and 46A, respectively. A stationary fastener 48 also extends between the plates 45. Spacers 49 and 50 are mounted on the fastener 48 and hinge pin 34, respectively. The spacers 49 and 50 stabilize the plates 45 by preventing the plates 45 from pulling together as the valve 12 opens and closes. A hinge pin 52 extends across rocker arm 31 and receives a complementary shaped notch 53 defined on the side edge 54 of each plate 45 when the lever arm 35 is in its closed position.

Figure 6:
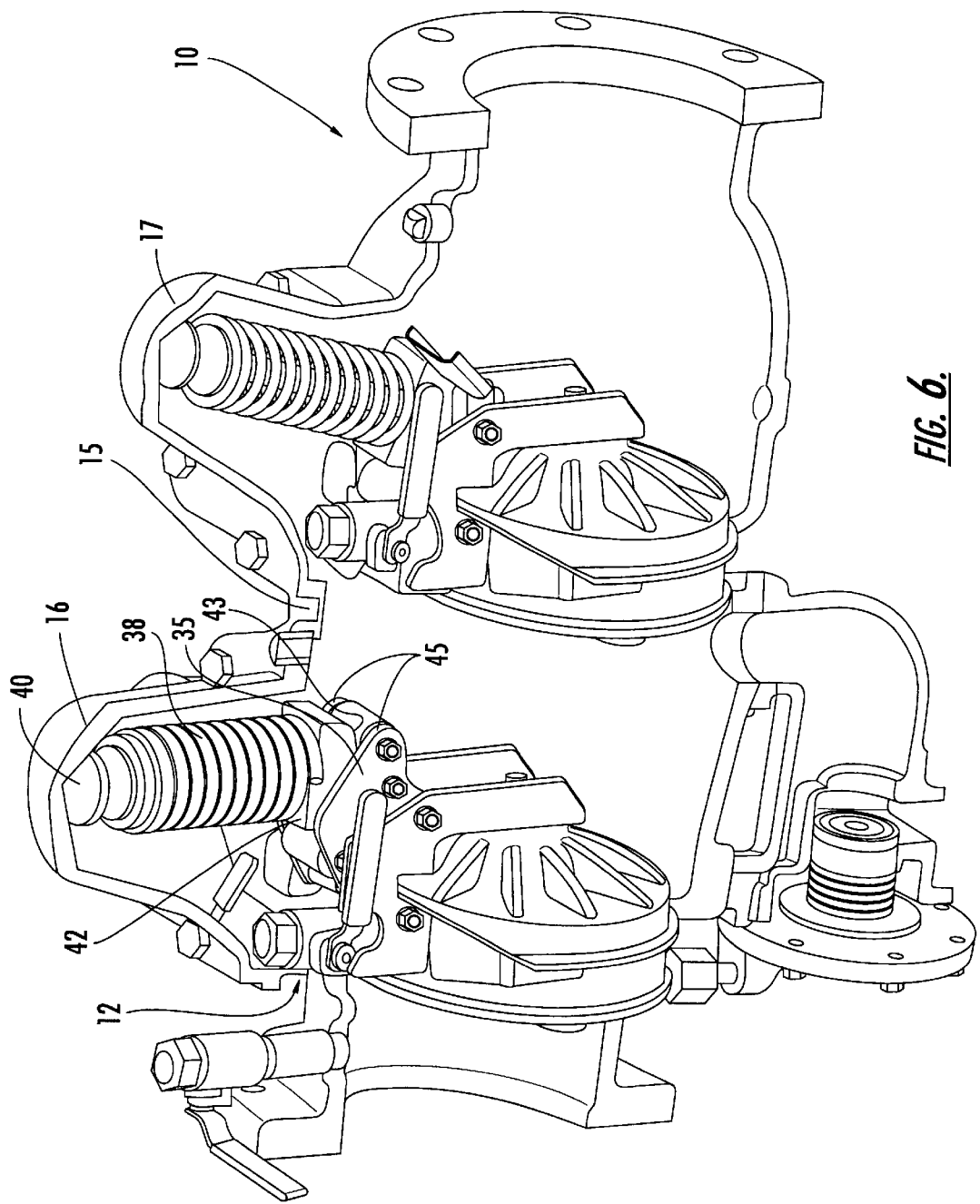
FIG. 6 is a partial cross-sectional perspective view of the backflow preventer according to FIG. 1 illustrating the swing check valves in the closed position.

Referring now to FIG. 6, the check valve 12 is shown positioned within the valve housing 15. When placed inside the housing 15, the convex cam surface 43 of the rocker shoe 42 is received between the plates 45 of the closed lever arm 35. Referring again to FIG. 1, when the clapper 30 is in the closed position, roller 47 engages the cam surface 43 of the rocker shoe 42 and cooperates with the spring 38 to produce the torque required to maintain the clapper 30 in the closed position.

The spring 38 produces a force vector that varies with the movement of the rocker arm 31 and the clapper 30. When the clapper 30 opens (see FIG. 2), the torque immediately begins to taper off as the force of the fluid against the clapper 30 creates a force on the rocker arm 31 which in turn causes the proximal end 33 of the rocker arm 31 to pivot about the hinge pin 34. Movement of the rocker arm 31 causes the lever arm 35 to simultaneously pivot about hinge pin 34, which in turn prompts the rocker shoe 42 to move in an arc across the rollers 47 and 47A, thereby causing the spring 38 to compress withing the housing 15 as the clapper 30 opens.

Although the spring 38 produces a greater load as it is compressed, the moment component of the torque shortens at a rate quick enough to nonetheless achieve excellent torque reduction. As is shown in FIG. 2, when the clapper 30 is fully open, the spring force vector is almost in alignment with hinge pin 34. The torque at this point approaches but does not reach zero, so that the clapper 30 is certain to close in response to a reduction in fluid flow.

In accordance with alternative embodiments not shown, smaller backflow preventers may utilize one or more pins molded or otherwise positioned on the backside of the clapper 30 to engage the rocker shoe 42. The pins may be fabricated from metal with a polished surface finish or a coating of any suitable friction-reducing material, or may be fabricated from any suitable plastic material. The use of such pins may be suitable where frictional forces are relatively low.

Because the assembly which includes the spring 38 and the assembly which includes the clapper 30 are completely separate and unattached, the unit is very easy to install and take apart. The cover 16 acts as a sealed access while at the same time acting as the loading mechanism and articulation surface (concave surface 43) for the spring 38. No fasteners are needed inside the valve housing 15, which eliminates the need for additional machining of threads or other means of locking the elements of the valve in the correct position. In addition, the elimination of fasteners within the valve housing 15 has reduced the effort needed to install the valve components and has eliminated surfaces on which corrosion may propagate in iron-bodied valve housings that have an epoxy coating.

Figure 7:
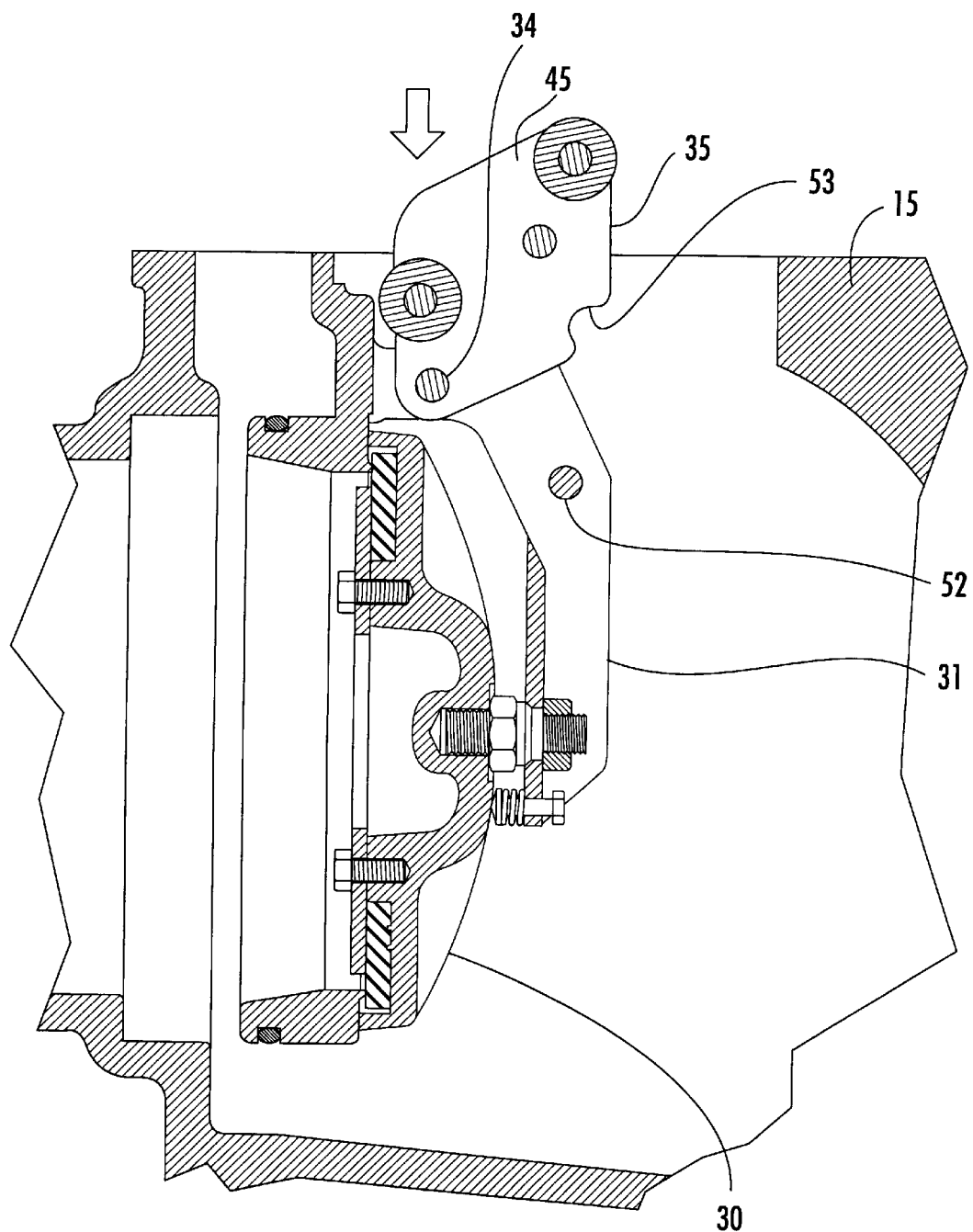
FIG. 7 is a cutaway cross-sectional view of the valve assembly of the present invention illustrating placement of the valve assembly into the interior of the valve housing of the backflow preventer.
Figure 8:
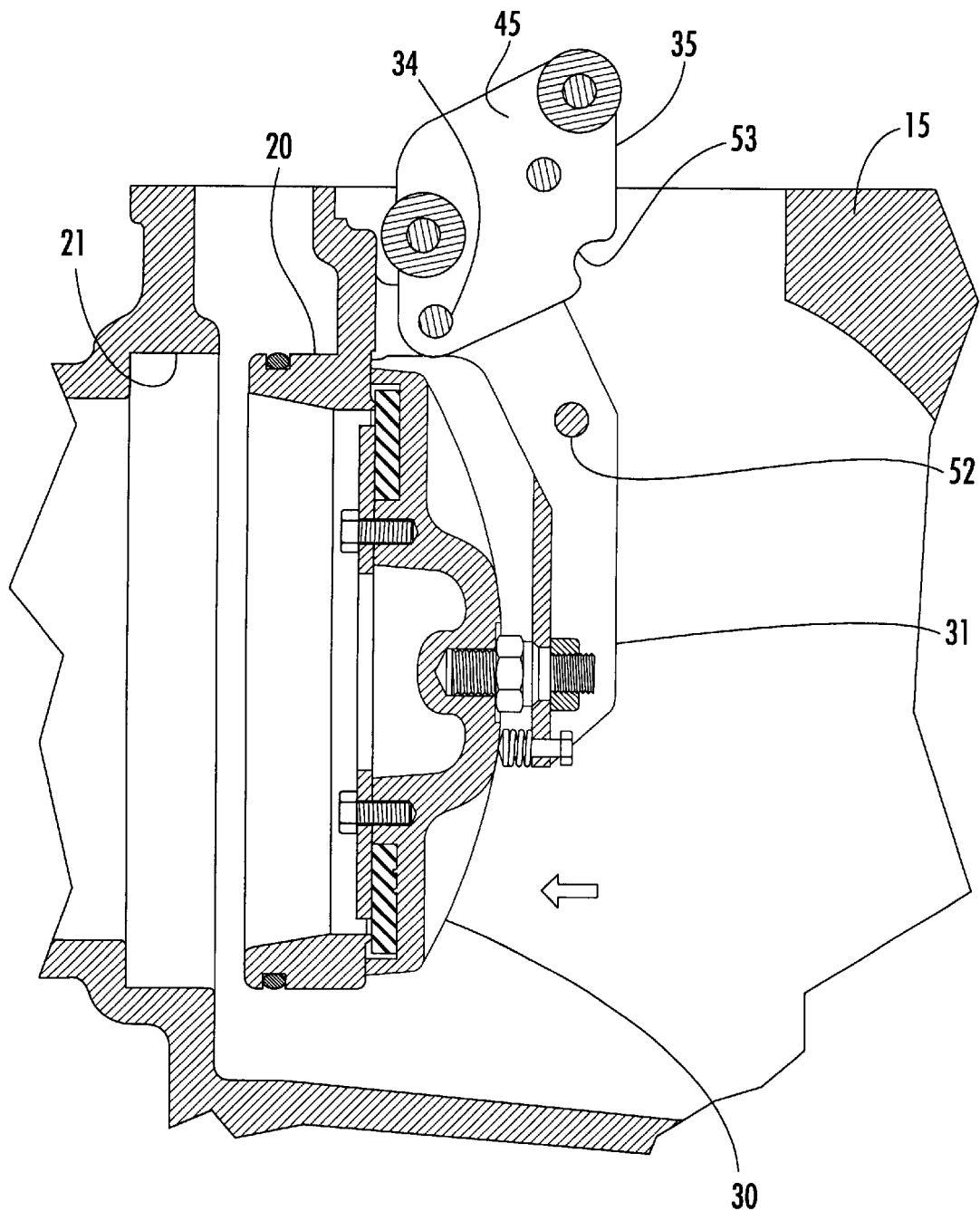
FIG. 8 is a cutaway cross-sectional view of the valve assembly of the present invention illustrating insertion of the valve seat into a port defined by the valve housing.
Figure 9:
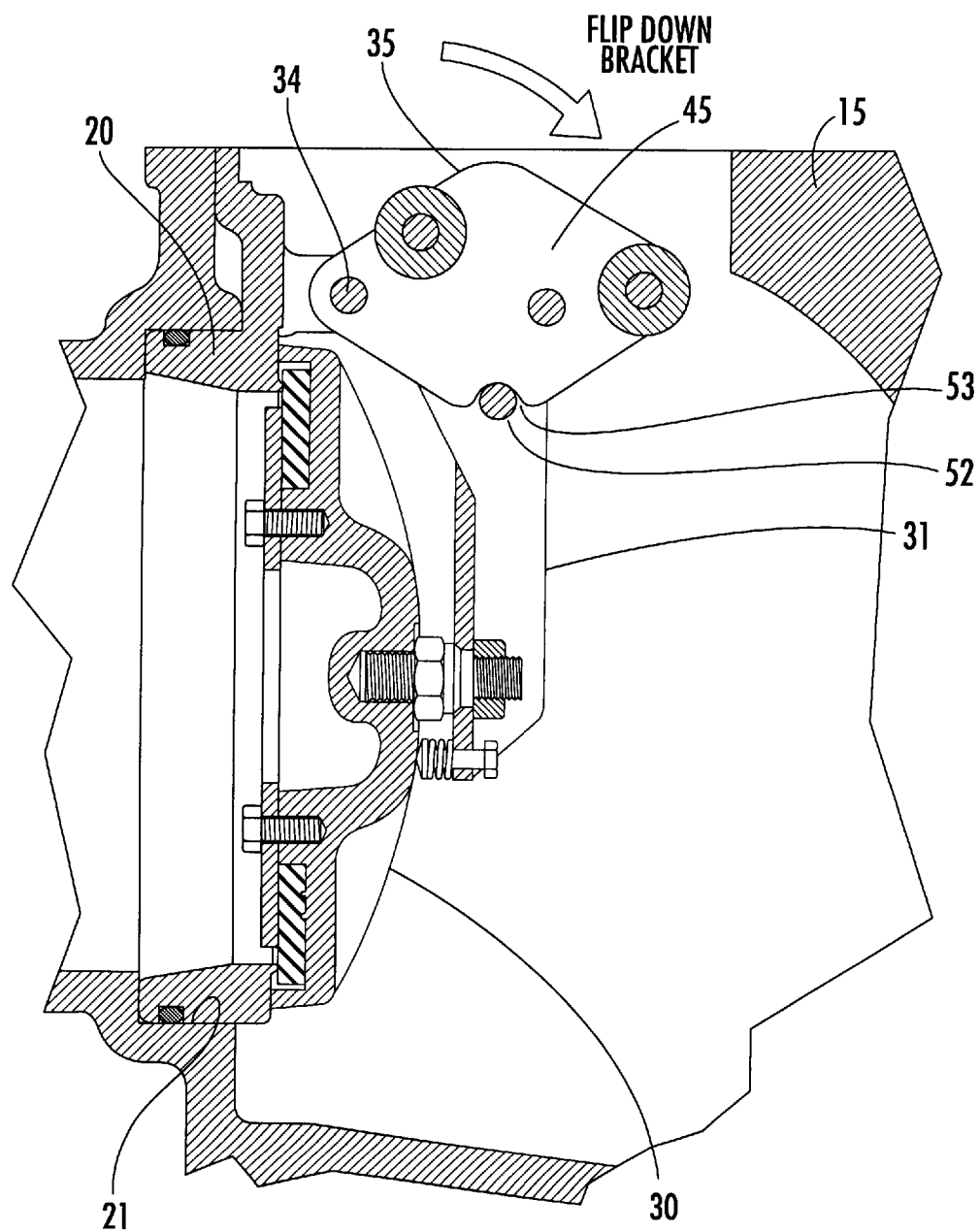
FIG. 9 is a cutaway cross-sectional view of valve assembly of the present invention illustrating the valve seat positioned within the port.

Referring now to FIGS. 7, 8 and 9, the manner in which the lever arm 35 is utilized to provide additional leverage for positioning the clapper 30 within the valve housing 15 is shown. As is shown in FIG. 7, which the clapper 30 is first lowered into the interior of housing 15, the lever arm 35 is pivoted on the hinge pin 34 so that the notches 53 on each plate 45 are moved away from the hinge pin 52. As is shown in FIG. 8, once positioned within the housing 15, the valve seat 20 is aligned with the port 21. The lever arm 35 is then utilized to increase the leverage available to insert the seat 20 within the port 21 in the direction "D" shown. As is shown in FIG. 9, once the valve seat 20 is positioned within the port 24, the lever arm 35 is moved to the closed position by positioning the hinge pin 52 within the notches 53 of the plates 45.

Referring again to FIGS. 1 and 2, the check valve 13 is shown in its closed and opened positions, respectively. Because the check valve 13 is formed from the same materials and includes many of the same components as check valve 12, like elements are shown using primary reference numerals. The primary differences between check valve 12 and check valve 13 lie in the shape of the housing cover 17 as compared to that of housing cover 16, and in the manner in which the spring 38' moves in response to movement of the clapper 30' and rocker arm 31'.

As is shown in FIG. 1, the rocker arm 31' lacks the lever arm 35 of check valve 12, and instead includes a static roller 60 mounted on the rocker arm 31' by a hinge pin 34' about which the rocker arm 31' also pivots. A dynamic roller 61 is mounted on the rocker arm 31' by a hinge pin 52'. The roller 61 engages the cam surface 43' of the rocker shoe 42'. A pivot foot 65 is positioned adjacent roller 61 and is connected to the rocker arm 31'. The pivot foot 65 extends downstream from the rocker arm 31' and cooperates with the spring 38 and rollers 60 and 61 to move the clapper 30' between the open and closed positions. When in the closed position, the pivot foot 65 contacts the cam surface 43'.

Note the relationship of the dynamic roller 61 on the cam surface 43' in relation to the static roller 60 and the hinge pin 34' about which the rocker arm 31' pivots. As is shown in FIG. 2, when valve 13 is in the open position, both of the rollers 60 and 61 engage the rocker shoe 42' at spaced-apart points on the convexity defined by cam surface 43'. Spring 38' produces a force vector that varies with the rotation of the rocker arm 31' and the clapper 30'. The rocker shoe 42' contacts the rollers 60 and 61 to produce the torque required to close the clapper 31'. When the force of the fluid on the clapper 30' begins to urge the clapper 30' open, the pivot foot 65 contacts the cam surface 43' and urges the rocker shoe 42' in a backflow direction opposite that of direction "D". The torque immediately begins to taper off because the initial point of contact "C" between the dynamic roller 61 and the rocker shoe 42' moves closer to the static roller 60.

Even though the spring 38' produces a greater load as it is compressed, the moment component of the torque shortens at a rate quick enough to achieve excellent torque reduction. FIG. 2 illustrates that when the clapper 30' is fully open, the spring force vector is almost in line with the static roller 34'. The torque at this point approaches but does not reach zero so that the clapper 30' is certain to close in response to a reduction in fluid flow.

Figure 10:
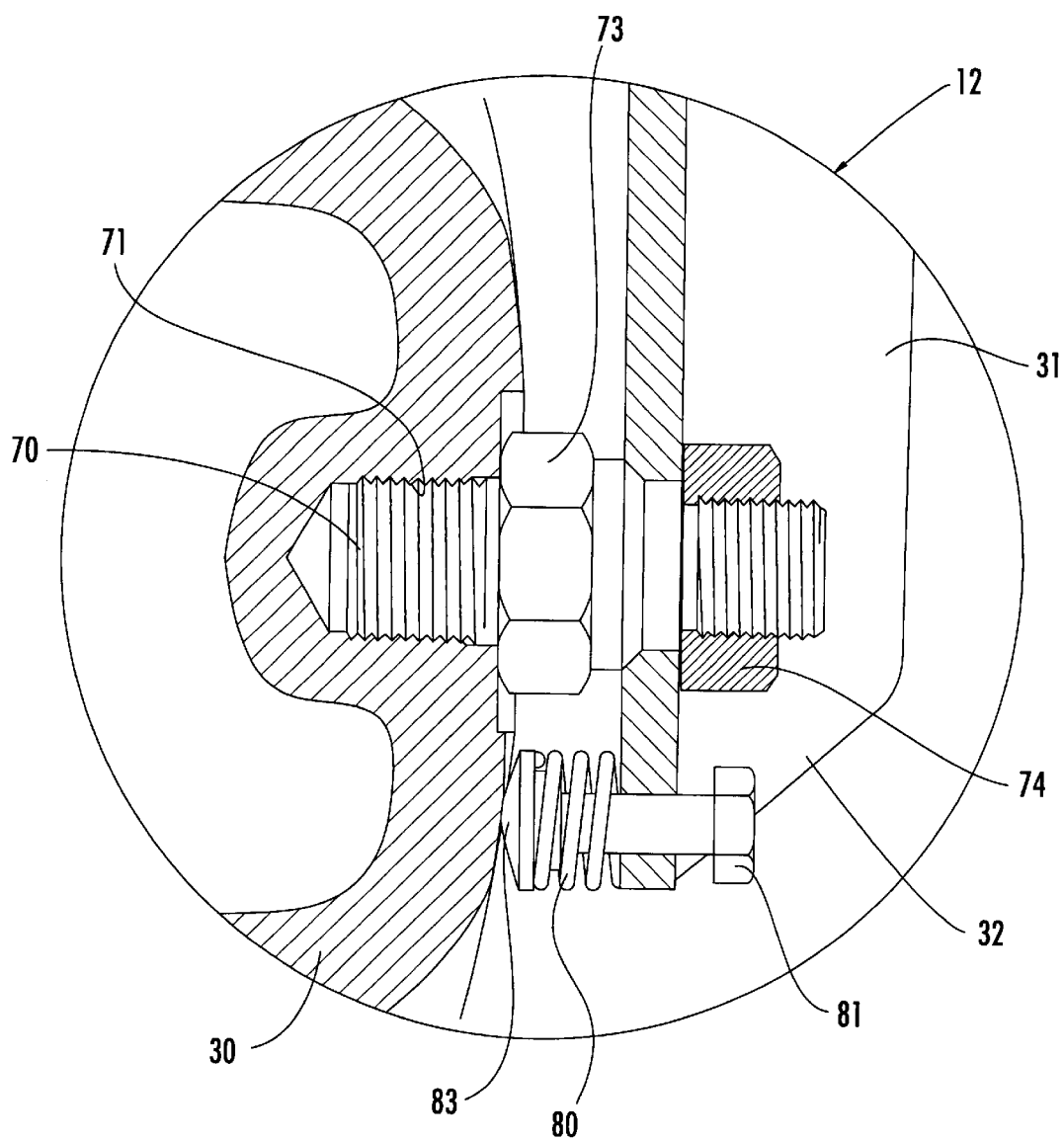
FIG. 10 is a partial cross-sectional view of one embodiment of an alignment compensator according to the present invention.

Referring now to FIG. 10 and using swing check valve 12 as a representative example, the manner in which the clapper 30 is mounted on the rocker arm 31 is shown. The clapper 30 is mounted on rocker arm 31 with a degree of looseness in order for the clapper 30 to disengage properly from the valve seat 20 when the clapper 30 moves to the open position. In particular, the clapper 30 is attached to the distal end 32 of rocker arm 31 by means of a threaded bolt 70 which is received in a complementary threaded bore 71 in the clapper 30. Proper spacing and between the rocker arm 31 and the clapper 30 is achieved by a nut 73. The opposite end of the bolt 70 is also threaded, and is received through a bolt hole defined in the rocker arm 31 and secured in place by a nut 74.

While a degree of looseness between the clapper 30 and rocker arm 31 is desirable when the clapper 30 is disengaging from the valve seat 20, such looseness can cause misalignment and "heel drag" when the clapper 30 is moving from the open to the closed, sealed position. Such "heel drag" causes the top end of the clapper 30 adjacent the pivot point of the rocker arm 31 to drag against the valve seat 20, and prevents a complete seal from forming at the bottom of the valve seat 20. As is shown in FIG. 10, this is prevented by an alignment spring 80 which is positioned on the distal end 33 of rocker arm 31. The spring 80 engages the back of the clapper 30, and is adjustable by means of an adjustment bolt 81. The spring 80 exerts a force against the clapper 30 which in turn tends to force the bottom end of the clapper 30 to engage the valve seat 20 at more nearly the same time as the top end of the clapper 30 engages the valve seat 20. A convex head 83 provides a smooth bearing surface with the clapper 30.

Figure 11:
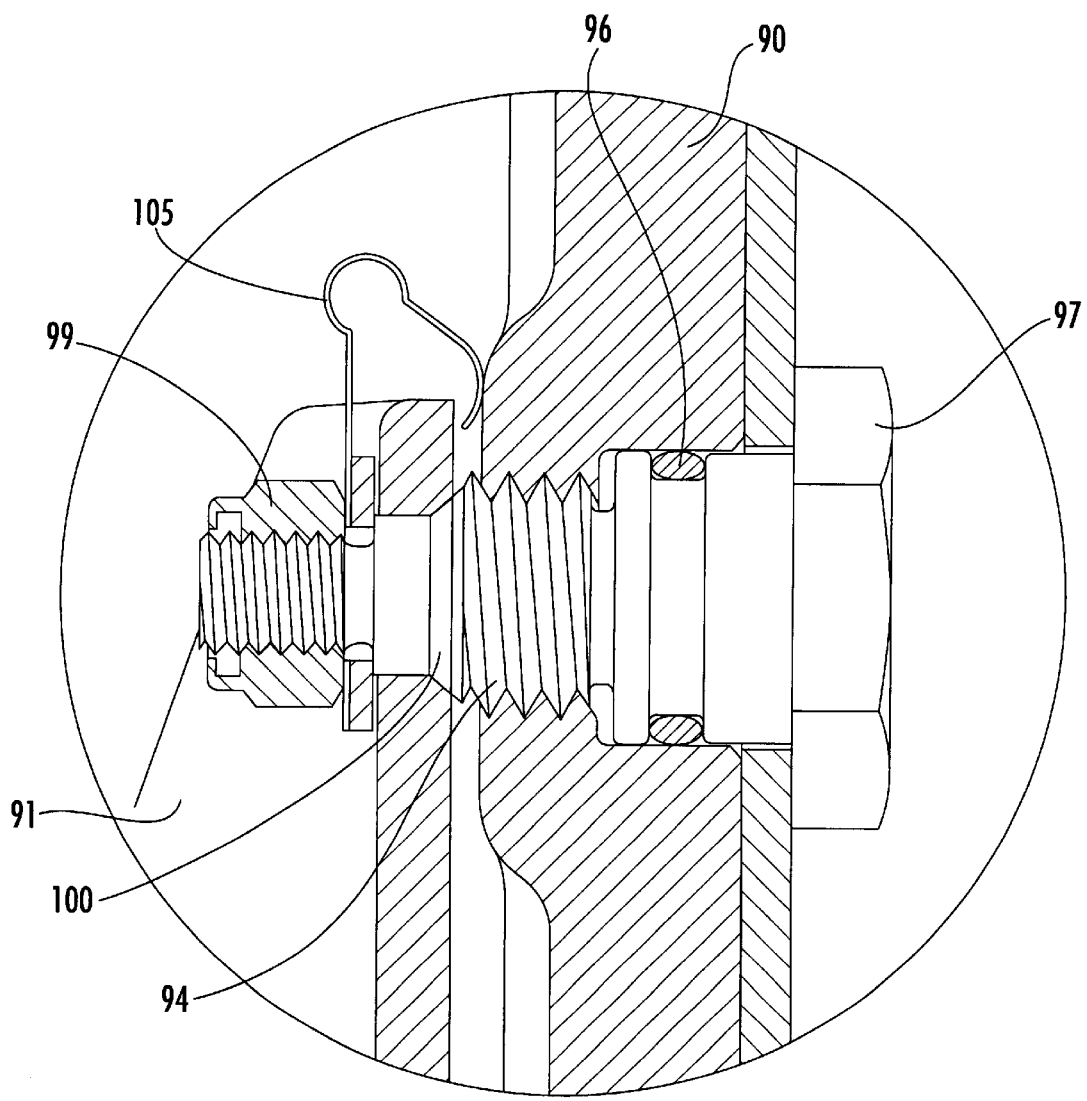
FIG. 11 is a partial cross-sectional view of an alternative embodiment of an alignment compensator according to the present invention.

Referring now to FIG. 11, another embodiment of the alignment spring is shown. In this embodiment, a clapper 90 is attached to a rocker arm 91 by a bolt 94. The bolt 94 penetrates through the clapper 90. Therefore, an o-ring seal 96 is provided to prevent fluid leakage past the clapper 90 when clapper 90 is closed. A nut 97 on the upstream side secures the bolt 94 to the clapper 90, and a nut 99 on the downstream side secures the bolt 94 to the rocker arm 91. A collar 100 provides proper spacing between the clapper 90 and the rocker arm 91. A flat spring 105 is captured by the bolt 99, the spring 105 engages the back side of the clapper 90 and exerts a force against the clapper 90 which tends to force the bottom end of the clapper 90 to engage the valve seat (not shown) at more nearly the same time as the top end of the clapper 90 engages the valve seat.

A swing check backflow preventer is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A swing check valve for controlling fluid flow, comprising:
   (a) a valve housing having a port for fluid flow therethrough, said valve housing including a removable cover for accessing an interior of the valve housing; and
   (b) a valve assembly disposed within said interior of the valve housing for controlling the fluid flow through the valve housing, said valve assembly including:
      (i) a valve seat in fluid communication with said port;
      (ii) a clapper mounted in the valve housing on a pivotally-mounted rocker arm and moveable between an open position responsive to fluid flow in a flow direction and a sealed position against said valve seat responsive to fluid flow in an opposite, backflow direction;

(iii) a spring captured in the valve housing by said removable cover without attachment to either the cover or valve housing, and normally urging the clapper into the sealed position against the valve seat;

(iv) a lever arm pivotally mounted on said rocker arm and moveable between an extended position for providing enhanced leverage against the rocker arm for positioning the clapper and rocker arm within the valve housing and a closed position for cooperating with said spring for urging the clapper into the sealed position;

(v) a first pivot carried by the spring and cooperating with a mating interior surface of the cover for permitting unattached pivotal movement of the spring relative to the cover; and (vi) a second pivot carried by the spring and cooperating with a first mating pivot surface carried on said lever arm for permitting unattached pivotal movement of the spring relative to the lever arm whereby said spring is allowed to pivot within the valve housing responsive to movement of the clapper.

2. A swing check valve according to claim 1, wherein the lever arm comprises a pair of spaced-apart, opposing planar members defining a void therebetween for receiving the spring.

3. A swing check valve according to claim 2, and including a spacer interconnecting said planar members for maintaining said void therebetween.

4. A swing check valve according to claim 2, and including a third pivot carried by the rocker arm and cooperating with a second mating pivot surface carried on the lever arm for pivotally mounting the lever arm on the rocker arm.

5. A swing check valve according to claim 4, and including a fourth pivot carried by the lever arm and cooperating with a third mating pivot surface carried on the rocker arm for permitting pivotal movement of the lever arm relative to the spring and the rocker arm.

6. A swing check valve according to claim 1, wherein said first pivot carried by the spring comprises a ball and said mating interior surface of the cover comprises a concave surface against which said ball pivots.

7. A swing check valve according to claim 1 or 2, wherein said second pivot comprises a convex bearing surface carried by the spring and said first mating pivot surface carried on the lever arm comprises at least one roller.

8. A swing check valve according to claim 7, wherein said at least one roller moves in an arc along said convex bearing surface as the clapper pivots.

9. A swing check valve according to claim 7, wherein said at least one roller is mounted and extends between said opposing planar members.

10. A swing check valve according to claim 4, wherein said third pivot comprises a hinge pin and said second mating pivot surface carried on the lever arm comprises a complementary opening defined by the lever arm and adapted for receiving said hinge pin therethrough.

11. A swing check valve according to claim 5, wherein said third mating pivot surface carried on the rocker arm comprises a hinge pin and said fourth pivot carried by the lever arm comprises a pair of concave surfaces against which said hinge pin pivots.

12. A swing check valve according to claim 11, wherein each of said concave surfaces comprises a notch defined by a side edge of a respective one of the planar members.

13. A swing check valve according to claim 1, wherein said spring is removably positioned within said valve housing for being axially compressed and expanded between two angles responsive to movement of the clapper, both of which angles are oblique to the direction of flow of fluid through the valve housing.

14. A swing check valve according to claim 1, wherein the force of said spring acting on the clapper when the clapper is in the closed position produces a torque that is greater than the torque produced by the spring acting on the clapper when the clapper is in the open position.

15. A swing check valve according to claim 1, and including an alignment compensator for preventing out-of-alignment movement of the clapper relative to the valve seat, and comprising an alignment spring mounted on said rocker arm and engaging the clapper at a point wherein the point of attachment of the rocker arm to the clapper is between the alignment spring and the pivot point of the rocker arm.

16. A swing check valve according to claim 15, wherein said alignment spring comprises a coil spring.

17. A swing check valve according to claim 15, wherein said alignment spring comprises a flat spring.

18. A swing check backflow preventer valve, comprising:

(a) a valve housing having a port for fluid flow therethrough, said valve housing including a pair of spaced-apart removable covers for accessing an interior of the valve housing; and (b) a pair of valve assemblies disposed within the interior of the valve housing for controlling the fluid flow through the valve housing, one of said valve assemblies including:

(i) a valve seat in fluid communication with said port;

(ii) a clapper pivotally mounted in the valve housing on a rocker arm and moveable between an open position responsive to fluid flow in a downstream direction and a closed position sealed against said valve seat responsive to fluid flow in an opposite, backflow direction;

(iii) a spring captured in the valve housing by one of said removable covers without attachment to either the cover or valve housing, and normally urging the clapper into the sealed position against the valve seat;

(iv) a lever arm pivotally mounted on said rocker arm and moveable between an extended position for providing enhanced leverage against the rocker arm for positioning the clapper and rocker arm within the valve housing and a closed position for cooperating with said spring for urging the clapper into the sealed position;

(v) a first pivot carried by the spring and cooperating with a mating interior surface of the cover for permitting pivotal movement of the spring relative to the cover; and (vi) a second pivot carried by the spring and cooperating with a mating pivot surface carried on said lever arm for permitting pivotal movement of the spring relative to the lever arm whereby said spring is allowed to pivot within the valve housing responsive to movement of the clapper.

19. A swing check backflow preventer valve according to claim 18, wherein the lever arm comprises a pair of spaced-apart, opposing planar members defining a void therebetween for receiving the spring.

20. A swing check backflow preventer valve according to claim 19, and including a spacer interconnecting said planar members for maintaining said void therebetween.

21. A swing check backflow preventer valve according to claim 19, and including a third pivot carried by the rocker arm and cooperating with a second mating pivot surface carried on the lever arm for pivotally mounting the lever arm on the rocker arm.

22. A swing check backflow preventer valve according to claim 21, and including a fourth pivot carried by the lever arm and cooperating with a third mating pivot surface carried on the rocker arm for permitting pivotal movement of the lever arm relative to the spring and the rocker arm.

23. A swing check backflow preventer valve according to claim 19, wherein said second pivot comprises a convex bearing surface carried by the spring and said first mating pivot surface carried on the lever arm comprises at least one roller.

24. A swing check backflow preventer valve according to claim 23, wherein said at least one roller is mounted and extends between said opposing planar members.

25. A swing check backflow preventer valve according to claim 22, wherein said third mating pivot surface carried on the rocker arm comprises a hinge pin and said fourth pivot carried by the lever arm comprises a pair of concave surfaces against which said hinge pin pivots.

26. A swing check backflow preventer valve according to claim 25, wherein each of said concave surfaces comprises a notch defined by a side edge of a respective one of the planar members.

27. A swing check valve for controlling fluid flow, comprising:
(a) a valve housing having a port for fluid flow therethrough, said valve housing including a removable cover for accessing an interior of the valve housing; and
(b) a valve assembly disposed within said interior of the valve housing for controlling the fluid flow through the valve housing, said valve assembly including:
(i) a valve seat in fluid communication with said port;
(ii) a rocker arm having proximal and distal ends, said proximal end pivotally mounted to said valve seat for being positioned adjacent the port;
(iii) a clapper mounted on said distal end of the rocker arm and cooperating with the rocker arm for movement between an open position responsive to fluid flow in a flow direction and a sealed position against said valve seat responsive to fluid flow in an opposite, backflow direction;
(iv) a spring captured in the valve housing by said removable cover without attachment to either the cover or valve housing, and normally urging the clapper into the sealed position against the valve seat;
(iv) a pair of spaced-apart, opposing planar members defining a void therebetween and mounted on the rocker arm by a hinge pin received within a complementary bore defined by the rocker arm for permitting coupled movement of said planar members between an extended position for providing enhanced leverage against the rocker arm for positioning the clapper and rocker arm within the valve housing and a closed position for cooperating with said spring for urging the clapper into the sealed position;
(v) a first pivot carried by the spring and cooperating with a mating interior surface of the cover for permitting unattached pivotal movement of the spring relative to the cover; and
(vi) a second pivot carried by the spring and cooperating with a first mating pivot surface carried on the lever arm for permitting unattached pivotal movement of the spring relative to the lever arm whereby said spring is allowed to pivot within the valve housing responsive to movement of the clapper.

28. A swing check valve for controlling fluid flow, comprising:
(a) a valve housing having a port for fluid flow therethrough, said valve housing including a removable cover for accessing an interior of the valve housing; and
(b) a valve assembly disposed within said interior of the valve housing for controlling the fluid flow through the valve housing, said valve assembly including:
(i) a valve seat in fluid communication with said port;
(ii) a rocker arm having proximal and distal ends, said proximal end pivotally mounted to said valve seat for being positioned adjacent the port;
(iii) a clapper mounted on said distal end of the rocker arm and cooperating with the rocker arm for movement between an open position responsive to fluid flow in a flow direction and a sealed position against said valve seat responsive to fluid flow in an opposite, backflow direction;
(iv) a spring captured in the valve housing by said removable cover without attachment to either the cover or valve housing and normally urging the clapper into the sealed position against the valve seat;
(v) a pair of spaced-apart, opposing planar members defining a void therebetween and mounted on the rocker arm by a hinge pin received within a complementary bore defined by the rocker arm for permitting coupled movement of said planar members between an extended position for providing enhanced leverage against the rocker arm for positioning the clapper and rocker arm within the valve housing and closed position for cooperating with said spring for urging the clapper into the sealed position;
(vi) a convex pivot surface carried by the spring and cooperating with a mating concave interior surface defined by the cover for permitting pivotal movement of the spring relative to the cover; and
(vii) a convex bearing surface carried by the spring and cooperating with at least one roller interconnecting the planar members for permitting unattached pivotal movement of the spring relative to the lever arm whereby the spring is allowed to pivot within the valve housing responsive to movement of the clapper.

29. A method for installing a valve assembly in a valve housing, comprising:
(a) providing a valve housing having a port for fluid flow therethrough, said valve housing including a removable cover for accessing an interior of the valve housing; and
(b) providing a valve assembly adapted for disposal within said interior of the valve housing for controlling the fluid flow through the valve housing, said valve assembly including:
(i) a valve seat in fluid communication with said port;
(ii) a clapper adapted for being mounted in the valve housing, said clapper pivotally mounted on a rocker arm and moveable between an open position responsive to fluid flow in a flow direction and a sealed position against said valve seat responsive to fluid flow in an opposite, backflow direction;
(iii) a spring adapted for being captured in the valve housing by said removable cover without attachment to either the cover or valve housing for normally urging the clapper into the sealed position against the valve seat;

(iv) a lever arm pivotally mounted on said rocker arm and moveable between an extended position for providing enhanced leverage against the rocker arm for positioning the clapper and rocker arm within the valve housing and a closed position for cooperating with said spring for urging the clapper into the sealed position;

(v) a first pivot carried by the spring and adapted for cooperating with a mating interior surface of the cover for permitting unattached pivotal movement of the spring relative to the cover; and (vi) a second pivot carried by the spring for cooperating with a first mating pivot surface carried on said lever arm for permitting unattached pivotal movement of the spring relative to the lever arm whereby said spring is allowed to pivot within the valve housing responsive to movement of the clapper;

(c) removing the cover from the valve housing, thereby permitting access to said interior of the valve housing; and (d) disposing the valve assembly in the valve housing by:
  (i) moving the lever arm to said extended position;
  (ii) positioning the clapper and rocker arm within the valve housing by using the extended lever arm to provide enhanced leverage against the rocker arm;
  (iii) moving the lever arm to said closed position;
  (iv) positioning the spring within the valve housing; and
  (v) replacing the cover on the valve housing, thereby capturing the spring in the valve housing and permitting the spring to cooperate with the closed lever arm for urging the clapper into the sealed position.

* * * * *